(12) United States Patent
Springmann

(10) Patent No.: US 9,895,921 B2
(45) Date of Patent: Feb. 20, 2018

(54) METHOD FOR PRODUCING SECURITY DOCUMENT BLANKS THAT CAN BE PERSONALIZED IN COLOR, SECURITY DOCUMENTS PERSONALIZED IN COLOR, AND METHOD FOR PERSONALIZATION

(71) Applicant: BUNDESDRUCKEREI GMBH, Berlin (DE)

(72) Inventor: Edward Springmann, Berlin (DE)

(73) Assignee: Bundesdruckeri GmbH, Berlin (DE)

( * ) Notice: Subject to any disclaimer, the term of this patent is extended or adjusted under 35 U.S.C. 154(b) by 388 days.

(21) Appl. No.: 14/412,763

(22) PCT Filed: Jul. 5, 2013

(86) PCT No.: PCT/EP2013/064221
§ 371 (c)(1),
(2) Date: Jan. 5, 2015

(87) PCT Pub. No.: WO2014/006173
PCT Pub. Date: Jan. 9, 2014

(65) Prior Publication Data
US 2015/0191027 A1  Jul. 9, 2015

(30) Foreign Application Priority Data
Jul. 5, 2012  (DE) .................. 10 2012 211 767

(51) Int. Cl.
*B42D 25/435*  (2014.01)
*B42D 25/373*  (2014.01)
(Continued)

(52) U.S. Cl.
CPC ............ *B42D 25/435* (2014.10); *B41J 2/442* (2013.01); *B41M 3/14* (2013.01); *B41M 5/24* (2013.01);
(Continued)

(58) Field of Classification Search
CPC .............................. B42D 25/435; B41M 5/24
(Continued)

(56) References Cited

U.S. PATENT DOCUMENTS

| 3,329,590 A | * | 7/1967 | Earl Renfrew Edgar .................. C25D 13/00 430/45.5 |
| 5,364,829 A | | 11/1994 | Kishimoto et al. |

(Continued)

FOREIGN PATENT DOCUMENTS

| CA | 2519404 A1 | 10/2004 |
| DE | 3826308 A1 | 2/1990 |

(Continued)

*Primary Examiner* — Kyle Grabowski
(74) *Attorney, Agent, or Firm* — Laurence A. Greenberg; Werner H. Stemer; Ralph E. Locher

(57) ABSTRACT

A method for producing a document blank or a security document includes providing a substrate layer having a metal layer or applying a metal layer to a substrate layer, forming a color-effective pattern in or on the metal layer, in which the pattern has a pixel structure and each pixel includes at least two subpixels which cause a monochromatic color effect, and joining together the substrate layer and at least one further transparent substrate layer to form a document body. A security document blank, a personalized security document and a method for the laser personalization of security document blanks in color are also provided.

10 Claims, 4 Drawing Sheets

(51) Int. Cl.

| | |
|---|---|
| *B41M 5/24* | (2006.01) |
| *B41M 3/14* | (2006.01) |
| *B42D 25/41* | (2014.01) |
| *B42D 25/43* | (2014.01) |
| *B42D 25/29* | (2014.01) |
| *B42D 25/328* | (2014.01) |
| *B42D 25/00* | (2014.01) |
| *B42D 25/351* | (2014.01) |
| *B42D 25/45* | (2014.01) |
| *B41J 2/44* | (2006.01) |
| *G03H 1/02* | (2006.01) |
| *G03H 1/22* | (2006.01) |
| *G03H 1/30* | (2006.01) |
| *B42D 25/455* | (2014.01) |
| *B42D 25/46* | (2014.01) |

(52) U.S. Cl.
CPC ............ *B42D 25/00* (2014.10); *B42D 25/29* (2014.10); *B42D 25/328* (2014.10); *B42D 25/351* (2014.10); *B42D 25/373* (2014.10); *B42D 25/41* (2014.10); *B42D 25/43* (2014.10); *B42D 25/45* (2014.10); *B42D 25/455* (2014.10); *B42D 25/46* (2014.10); *B42D 2033/10* (2013.01); *B42D 2033/20* (2013.01); *B42D 2035/14* (2013.01); *B42D 2035/24* (2013.01); *B42D 2035/36* (2013.01); *G03H 1/0248* (2013.01); *G03H 2001/2234* (2013.01); *G03H 2001/303* (2013.01); *G03H 2250/42* (2013.01)

(58) Field of Classification Search
USPC .................. 283/77, 93; 430/9–18, 495.1
See application file for complete search history.

(56) References Cited

U.S. PATENT DOCUMENTS

| | | | | |
|---|---|---|---|---|
| 5,932,318 | A * | 8/1999 | Uchiyama | B41C 1/14 283/117 |
| 6,633,321 | B1 * | 10/2003 | Maurer | B42D 25/00 347/224 |
| 6,986,926 | B2 | 1/2006 | Fannasch et al. | |
| 8,100,436 | B2 | 1/2012 | Heine et al. | |
| 2003/0107638 | A1 * | 6/2003 | Field | B42D 25/41 347/105 |
| 2008/0106002 | A1 | 5/2008 | Feldman et al. | |
| 2012/0127547 | A1 * | 5/2012 | Gocho | B42D 25/21 359/2 |
| 2012/0194884 | A1 * | 8/2012 | Shinoda | B42D 25/328 359/2 |
| 2013/0099473 | A1 * | 4/2013 | Harrison | B42D 25/00 283/85 |
| 2013/0314486 | A1 * | 11/2013 | Goldau | B42D 15/00 283/85 |
| 2013/0328995 | A1 * | 12/2013 | Lazzari | B42D 25/00 347/232 |

FOREIGN PATENT DOCUMENTS

| | | | |
|---|---|---|---|
| DE | 102005011612 A1 | 2/2006 | |
| EP | 1918123 A1 * | 5/2008 | ............ B42D 25/00 |
| WO | 0235444 A1 | 5/2002 | |
| WO | 2004089638 A1 | 10/2004 | |
| WO | 2009021737 A1 | 2/2009 | |
| WO | 2011104331 A1 | 9/2011 | |
| WO | 2011124774 A1 | 10/2011 | |
| WO | 2012069536 A1 | 5/2012 | |
| WO | 2012069547 A1 | 5/2012 | |
| WO | WO 2012069547 A1 * | 5/2012 | ........... B42D 25/351 |

* cited by examiner

METHOD FOR PRODUCING SECURITY DOCUMENT BLANKS THAT CAN BE PERSONALIZED IN COLOR, SECURITY DOCUMENTS PERSONALIZED IN COLOR, AND METHOD FOR PERSONALIZATION

BACKGROUND OF THE INVENTION

Field of the Invention

The invention relates generally to the field of producing security documents, to security document blanks and to a method for subsequently personalizing security document blanks. In particular, the invention relates to a method for producing security document blanks which are intended for subsequent decentralized color personalization, to such security document blanks and to a method for color personalization.

Security documents are documents comprising at least one feature that makes imitation, duplication, forgery or the like at least difficult or impossible. Such a feature is referred to as a security feature. Documents comprising at least one security feature are referred to as security documents. Security documents comprise by way of example passports, identity cards, driver's licenses, visas, bank cards, postal stamps, bank notes, other documents of value, such as phone cards, but also entrance tickets and/or packaging which are secured against being forged, to name but a few by way of example.

It is desirable in particular for such security documents which are assigned to individual persons to permanently store in the security document personal information assigned to the individual or other individual information. Said information is moreover intended to be capable of subsequently being captured and evaluated by a human observer or by a machine capturing method for purposes of verification.

The prior art discloses methods in which the individual or personal data is integrated in the security document as early as its production. Personal and/or individual data is, by way of example, printed onto a substrate layer, which is subsequently bonded to further substrate layers to form a document body. Forgery-proof security documents in particular are produced nowadays with a document body which is bonded from a plurality of substrate layers, in particular plastic layers. If all the plastic layers are, for example, produced on the basis of the very same polymer material, they can be bonded in a high-pressure, high-temperature lamination method to form a monolithic document body. A document body is referred to as monolithic if the original boundary surfaces at which the substrate layers are placed on top of one another during lamination are no longer recognizable in the finished document body because of the plastic structure. Owing to different properties of the various substrate layers, for example owing to coloring using colorants, the different original substrate layers in a monolithic document body continue to be clearly recognizable as material layers.

A multiplicity of security features which impart a particularly high degree of security can be integrated in the security documents only in a central manufacturing device. These include for example holographic structures, but also the introduction of electronic structures, for example a microchip or the like. However, it is frequently desirable to make it possible for security documents provided with such highly secure features to be reliably personalized at short notice and possibly also decentrally.

It is known for example from the prior art to form individual plastics-based substrate layers such that, relative to other plastic layers, they favor absorption of laser light but have no significant limitation in terms of their transparency in the visible wavelength range. Such substrate layers are also referred to as laserable substrate layers. Via irradiation with focused laser radiation, said substrate layers can be permanently locally colored, in particular blackened, in a finished document body. Depending on the radiated in laser energy, grades with respect to the blackening are achievable here, such that gray levels can also be represented. However, a disadvantage of the hitherto known method is that, in this way, only black-and-white or gray-level representations are storable.

WO 2002/035444 A1 discloses a method for writing data, in particular personalization data, onto and/or into a data carrier using electromagnetic radiation, wherein, in the method, an arbitrary data carrier is made available, on and/or in which at least one colorant is provided at least locally, and said colorant is irradiated using the electromagnetic radiation of at least one wavelength range such that in the area of the irradiation the color of the colorant changes owing to bleaching, wherein this change in color can be determined by machine and/or by the human eye. The purpose of this is to achieve a subsequent color personalization. However, such and other methods have not yet proven to be practical for the mass production of security documents. Colored, in particular fully colored intensive images or stored information are not yet possible.

WO 2004/089638 A1 discloses a method for generating information, a carrier body in which the information is generated, and the use of such a carrier body. In the method for generating information in a carrier body, provision is made for information to be generated which is stable in the long term in particular with respect to light and humidity. To this end, for a number of starting materials available in the carrier body, those reaction conditions which cause the starting materials to undergo a synthesis reaction are set in a localized partial area of the carrier body by laser irradiation. The end product of such a synthesis reaction preferably is the color of a primary color of a color system.

WO 2009/021737 A1 discloses a method and an apparatus for individualizing security documents in color and security documents having a document body for individualizing in color. Such a document body contains within it starting materials which are excitable using a localized introduction of energy in a targeted way to form nanoparticles of various forms and/or of various local concentrations, wherein a color sensation of the nanoparticles is dependent on their form and/or their concentration. For the individualization of a security document having such a document body, energy is locally introduced in a targeted manner at a site at which a colored color sensation is intended to be brought about in the document body in order to store individualized information via the brought-about color sensation. The apparatus for individualization comprises an energy source by means of which energy can be introduced into the document body in a targeted and controlled manner.

WO 2011/104331 A1 discloses a marking apparatus for a document of value or a security document and a method for permanent, in particular individual, multi-color marking of documents of value and/or security documents. The method for permanent color marking of a document of value or a security document comprises the following steps: providing a document body which comprises areas of various colorfulness, wherein the individual areas are in each case of one color; providing a marking apparatus, which comprises at least one laser light source for generating laser light and a light guiding apparatus which is coupled to the at least one laser light source such that a focus of the laser light of the laser light source can be positioned in a controlled manner on or in the document body of the document of value or security document; positioning the focus in an iterative and targeted manner on or in the document body and irradiating with laser light in order to locally change the color of one or more of the areas in a targeted manner such that the document body subsequently induces a multi-color color sensation in a human observer during irradiation with white light, wherein the laser light is radiated in using short or ultra-short laser pulses, having a pulse duration of less than 100 ps or less than 10 ps. As a result, it is possible to use non-linear interactions between the material of the document of value or security document and the laser light for marking. As a result, improved focusing of the laser light and thereby a greater density of the colored markings which define the colorfulness can be used or generated such that a greater color intensity can be realized.

WO 2012/069536 A1 discloses a document of value and/or security document having preferably at least one document level. A first pattern formed from first image elements is situated in one or more first planes. Furthermore, a second pattern which is formed from second image elements and arranged in register with the first image elements of the first pattern is situated in one or more second planes. The second image elements are situated, as viewed from one viewing side of the document, in front of the first image elements. A respective second image element is arranged only over part of the first image elements. If the first image elements are in color, colored information can be coded via selectively configuring the second image elements.

WO 2012/069547 A1 discloses likewise a document of value and/or security document having at least one document level. A first pattern formed from first image elements is situated in one or more first planes. Furthermore, a second pattern which is formed from second image elements and arranged in register with the first image elements of the first pattern is situated in one or more second planes. The second image elements are situated between the first image elements and outer sides of the document of value and/or security document. A respective second image element is arranged only over part of the first image elements. The first pattern elements are configured to be transparent and/or translucent. The remaining document of value and/or security document is also configured to be transparent and/or translucent with respect to one viewing axis in the area of the first pattern elements, except for the second pattern elements, such that information defined by the patterns is perceivable in transmitted light. If the first image elements are in color, the information is also colored.

BRIEF SUMMARY OF THE INVENTION

The invention is therefore based on the object of eliminating the disadvantages known from the prior art and providing a manufacturing method for security documents that can be personalized in color, security document blanks that can be personalized in color and security documents and security document blanks and a method for colored laser personalization of security document blanks.

The invention is based upon the idea of introducing into a security document body a substrate layer having a thin metal layer which reflects light. Additionally, a color-effective pattern is formed on the or in the metal layer, which color-effective pattern has pixels, and wherein each pixel has or comprises at least two subpixels which in each case bring about a monochromatic color effect. The metal layer and the color-effective pattern are overlaid or covered by a transparent plastic layer which prevents external mechanical damage and/or manipulation. Owing to the subpixels of each pixel that bring about a different color effect, a human observer experiences, if the pixels and subpixels are configured to be of suitable size, a color sensation which, owing to the color mixing, deviates from the color sensations of the subpixels which bring about in each case a monochromatic color effect. An observer will thus perceive a mixed color. This is exactly what happens when a camera which is unable to resolve the individual subpixels separately is used for capturing.

Such a security document blank can be subsequently personalized by removing the color effect of individual subpixels, starting from the personalization data. On the basis of the color personalization and/or individualization data, the monochromatic subpixels, which are necessary for bringing about the respective color sensation due to the color mixing, are thus ascertained. The remaining pixels are then manipulated such that their color effect no longer occurs. This is achieved by locally demetalizing the metal layer in a targeted fashion via irradiation with focused electromagnetic radiation, in particular focused laser radiation, specifically in those regions or at those sites to which are assigned those subpixels of the color pattern to be removed that are not necessary for the color representation of the corresponding individualized or personalized information.

DEFINITIONS

A metallic layer is any layer which comprises metallic elements, alloys of metals and/or metal oxide or other metal compounds which are reflective. In particular, these layers may be formed from silver, gold, copper, aluminum, platinum, iron or alloys of these metals.

Visible light is light which is in the wavelength range that a human eye can detect. The infrared wavelength range is that wavelength range which follows the visible spectrum in the long-wave range. UV radiation is that part of the electromagnetic spectrum which follows the short-wave wavelength range of the visible spectrum.

A pixel is a unit of information to which a specific color hue is assigned. A subpixel is a constituent part of a pixel which is of monochrome configuration and contributes, in conjunction with other subpixels, to bringing about a color effect of the pixel or its color hue. A color effect is monochromatic if a color sensation corresponds to the color sensation brought about by light with a limited spectral wavelength range.

Color mixing occurs by bringing about a color sensation in a human observer which is brought about by light of different wavelengths that is assigned to different spectral colors bringing about, as a whole, a color sensation in the human observer which differs from the color sensations that correspond to the corresponding spectral colors of the light used in the color mix. If, for example, red, blue and green light are superposed, a human observer perceives the light as white. If spectrally green and spectrally red light are superposed, the superposition is perceived as yellow light. A superposition of red and blue light is perceived as magenta-colored light. In this way, a virtually unlimited number of color sensations can be brought about, as long as not only the wavelengths used but also the intensity proportions of the light of different wavelengths can be matched individually. Such matching can be determined for example via a number of the subpixels that are assigned to the individual spectral colors or base colors of a color system, as long as each pixel or each image information constituent part that can have a different color hue is assigned a plurality of subpixels of the same monochromatic base color. However, even if each pixel is assigned only for example three sub-image areas or subpixels which bring about a different monochromatic color sensation, it is still possible to bring about at least seven different color sensations, for example the colors red, yellow, green, cyan, blue, magenta and white in a red-green-blue color system.

In one embodiment, colorants which absorb light of specific wavelengths and thus bring about a color effect can also be used. Even with different colorants of this type, color mixing can be used to achieve a total color sensation.

The area of a metal layer which, together with the subpixel of the color-effective pattern, brings about its color effect when viewed in reflected light, is referred to as subpixel region.

PREFERRED EMBODIMENTS

Suggested in particular is a method for producing security document blanks or security documents which can be personalized by laser in color, comprising the following steps: providing a substrate layer with a metal layer or applying a metal layer on a substrate layer; forming a color-effective pattern in or on the metal layer, wherein the color-effective pattern has a pixel structure and each pixel comprises at least two subpixels which bring about a monochromatic color effect; and bonding the substrate layer to at least one further transparent substrate layer to form a document body. The result is therefore a security document blank for color personalization by laser, which comprises a document body having a metal layer and a color-effective pattern formed in or on the metal layer, wherein the color-effective pattern has a pixel structure and each pixel comprises at least two subpixels which bring about a monochromatic color effect, and the metal layer and the color-effective pattern are covered by one or more transparent substrate layers. Such a security document blank or method for producing a security document blank can be configured into a method for producing security documents or a method for color personalization by laser by processing an above-described security document blank by capturing colored personalization information, by generating focused electromagnetic radiation, in particular a focused pulsed laser beam, and by directing the focused electromagnetic radiation, in particular the focused pulsed laser beam, onto the metal layer such that regions of the metal layer are locally demetalized in a targeted fashion, such that the color effect of the subpixels assigned to this area which has been demetalized in a targeted fashion is removed. The focused electromagnetic radiation, for example the focused laser beam, is thus directed onto the metal layer in a controlled manner corresponding to the colored individualization information and/or personalization information.

It has proven to be particularly advantageous if the metal layer is structured, or provided in a structured manner, such that each subpixel is assigned a subpixel region of the metal layer, which is separate and at a distance from neighboring subpixel regions. The metal layer is thus structured into subpixel regions. With particular preference, the subpixel regions here have a geometrical shape which is circular or elliptical. This is matched in an optimum fashion to focused electromagnetic radiation, in particular to a laser beam cross section of a focused laser, such that a subpixel region is located completely in the focus of an optimally aligned laser during demetalization, but without irradiating a neighboring subpixel region. Separating the individual subpixels from one another and arranging them at a specific distance apart offers a number of advantages. One advantage is that, as long as the substrate layer is a plastic layer, said layer joins better with a further substrate layer arranged on top of it, which is likewise a plastic layer. Between the individual metallic subpixel regions, webs made of plastics material can form during joining. A further advantage is that introduction of energy by way of the focused light, in particular by way of focused laser light, cannot be dissipated through thermal conduction processes in the metal layer into regions which are not intended to be demetalized. A targeted localized demetalization is therefore simplified and can be carried out with precision. Good demetalization can generally also be achieved if the focus of the radiation has a smaller diameter than a subpixel region.

In one embodiment, the subpixel regions are produced by way of vapor deposition. For example, a mask can be placed onto the substrate layer, which mask covers those areas that are not meant to be covered by the metal layer. Alternatively, the subpixel regions can be formed by way of a lithographic method.

The color-effective pattern can be formed by way of example by applying colorants or introducing colorants into the metal layer. For example, once again it is possible to use masks which are matched to the subpixel regions and are aligned therewith such that only the subpixel regions which are assigned to a specific group of subpixels which bring about the same monochromatic color effect are coated at the same time, for example with colorants. It is likewise possible for the colorants to be mixed in for example during the vapor deposition and for a plurality of vapor deposition processes to be carried out with different masks that are matched to one another. In yet another embodiment, in which the subpixel regions are produced by lithographic means, it is possible for the metal layers to be colored using chemical reaction. However, colorants are preferably applied to the metal layer. Metal layers structured by lithography can thus be used with color-effective patterns which are configured in any desired fashion.

The great advantage of the invention is that a large amount of energy can be introduced in a strongly localized fashion into a metal layer inside a plastic body, in the present case a security document blank, using pulsed laser energy, which amount of energy can be limited to a very small region, that is to say the layer itself, and to an area located directly in front of it, with respect to the lateral extent along the beam direction. It is thus possible to achieve local energy densities which cannot be achieved during typical trans-irradiation of a plastics without, for example, carbonizing the plastic itself. However, metal layers inside the plastic body can be locally destroyed through the introduction of energy using electromagnetic radiation such that these become transparent at the demetalized site. Colorants which are applied directly onto the layer or arranged thereon can likewise be destroyed by the introduction of energy such that the color effect of the colorants likewise completely disappears locally.

In another embodiment, the color-effective pattern is formed on the metal layer for example using holographic structures. In one embodiment, the metal layer itself is structured on its surface.

In yet another embodiment, a hologram is arranged in particular over the metal layer which is preferably already structured into subpixel regions, which hologram consists of a multiplicity of partial holograms which include in each case a monochromatic image information item for a subpixel of the color-effective pattern. The hologram can be, for example, a volume transmission hologram which has a dot pattern, wherein each pixel is assigned a plurality of subpixels. The volume transmission hologram can be configured, for example, such that it directs reconstruction light that is incident from a predefined direction onto the area of the metal layer which is located thereunder and assigned to the pixel, in each case in a direction which deviates from the geometrical optics. Each partial hologram directs light of a predefined spectral wavelength or a spectral range onto an area located thereunder, for example onto the assigned subpixel region located thereunder. The volume transmission hologram is thus a hologram which comprises at least two types of partial hologram, preferably at least three types of partial hologram, wherein each type diffracts light of a spectral wavelength range. For example, a volume transmission hologram can be configured such that it diffracts white light which is made up of red, green and blue light of predefined wavelengths and which is incident on a volume transmission hologram of planar construction at an angle of 45°, in each case according to the respective partial hologram type, such that it exits the hologram as if it had been radiated in at 15° with respect to a surface normal of the hologram and passed through the hologram in a straight line. The diffracted light is subsequently incident on the subpixel region of the metal layer located thereunder and is reflected thereby, and then exits at −15° with respect to the surface. The non-diffracted reconstruction light exits at an angle of −45° with respect to the surface normal after reflection at the metal layer. In each case it is assumed that the corresponding subpixel region was not selectively demetalized.

If, then, selective areas (for example subpixel regions) of the metal layer are destroyed during personalization by laser, the color components of the subpixels assigned to these areas are not reflected, such that the color of the corresponding pixel changes as desired. The angles described were chosen only as examples. Preferably, the diffracted light will not strike the metal layer parallel to the surface normal thereof, since otherwise there is a risk that part of the light or all of the light is diffracted back through the hologram. However, if the laws of reflection are utilized, the angle of incidence and the exit angle measured relative to the surface normal will differ from one another in terms of their sign, but not in magnitude.

Since a black color hue cannot be produced at all or only unsatisfactorily with subpixels which bring about a different color effect, the substrate layer on which the metal layer is formed or will be formed is arranged preferably above a laserable layer and bonded thereto and to the covering substrate layer to form a document body. After demetalization of a subpixel region or a plurality of subpixel regions, with particular preference all subpixel regions, of a pixel, carbonization of the laserable substrate layer located thereunder can be achieved by way of further radiating in focused laser light, and a pixel with a gray level or in black can be produced. Irradiation with laser radiation, which serves for changing the color of the laserable substrate layer, takes place preferably with pulsed laser radiation and in a manner such that the gray level or the blackening can be adjusted via the number of laser pulses used within a time interval.

A particularly good contrast and a light colored image are obtained if a substrate layer which is configured to be white or transparent is used under the substrate layer and, if a laserable substrate layer is used, under said laserable substrate layer.

It goes without saying that the metal layer does not have to cover over the entire document surface area. However, embodiments in which the metal layer spans the entire surface area of the security document are possible. It is likewise possible for the metal layer and, if appropriate, also the color-effective pattern arranged thereon to be provided or produced in the form of a patch or metal strip, and so to be integrated as a patch or strip in a security document before various substrate layers are laminated into the security document.

In one embodiment, all subpixels are located in one plane. This embodiment permits simple integration and personalization and a compact construction of the document.

In a further embodiment, only subpixels of the same color are located in one plane. This is advantageous if the subpixels are produced for example in a lithographic manner from a surface-area coating. An additional result is that on account of the arrangement of the different subpixels in different planes, the focus of a personalizing laser for each color must be adjusted for a different "depth." This represents an additional obstacle which a forger who obtains a non-personalized document by illegal means must overcome in order to personalize it.

BRIEF DESCRIPTION OF THE SEVERAL VIEWS OF THE DRAWING

The invention will be explained in more detail below with reference to a drawing on the basis of preferred embodiments.

DESCRIPTION OF THE INVENTION

Figure 1:
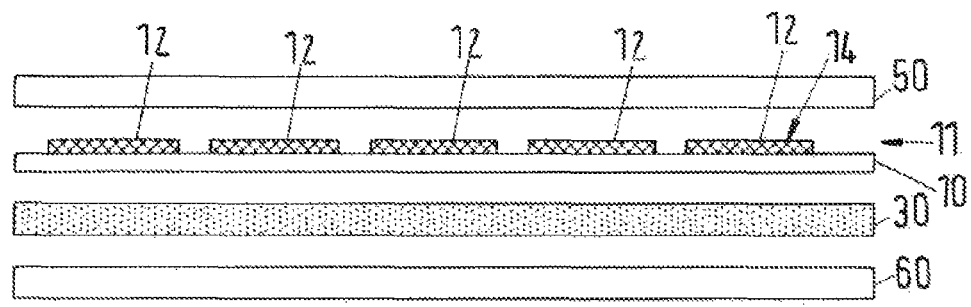
FIG. 1 shows an exploded drawing of substrate layers, from which a security document blank is formed.

The construction of a security document blank and its production will be explained schematically on the basis of FIG. 1. The same technical features are marked with the same reference signs throughout the figures.

For production, a substrate layer 10 on which a metal layer 11 is formed or will be formed is provided. The substrate layer 10 can be a metallized plastic sheet. The metal may be any metal, preferably it will be for example aluminum or an aluminum oxide alloy. The metal layer 11 preferably has a reflective surface 14. The metal layer 11 is preferably divided into what are known as subpixel areas or subpixel regions 12. These are preferably arranged or configured to be separate and at a distance from one another on the substrate layer 10. If a metallized sheet is provided as a substrate layer 10 having the metal layer 11, the metal layer 11 is preferably structured so as to form individual subpixel regions 12 which are separate and at a distance from one another. In simple embodiments, a non-structured metal layer 11 may also be used.

Figure 2:
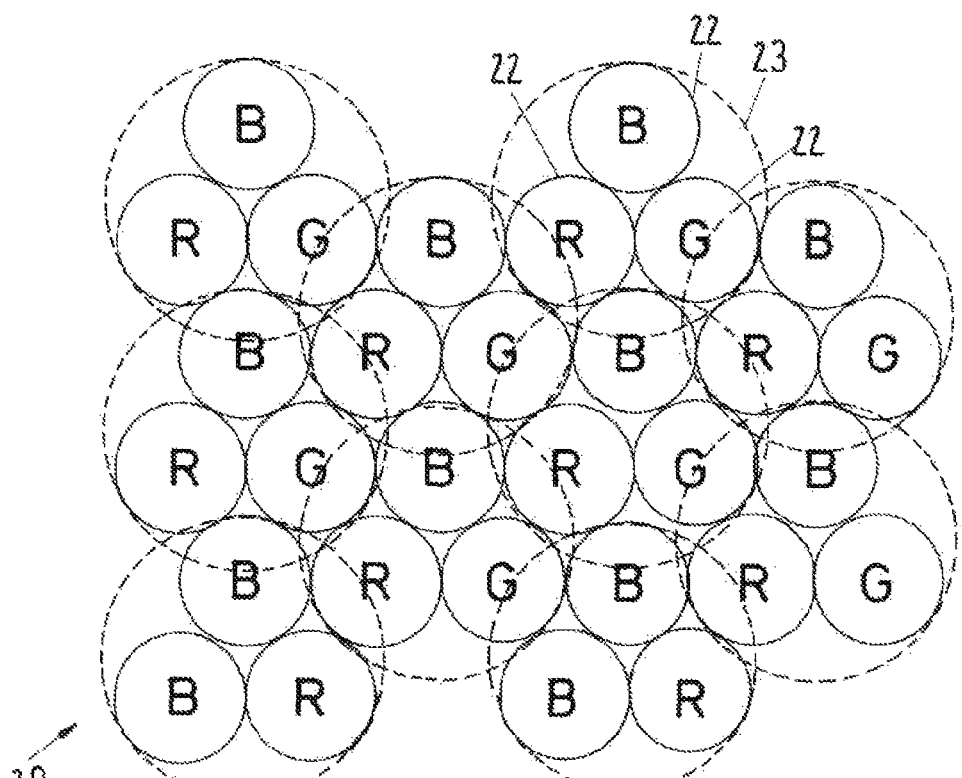
FIG. 2 shows a schematic illustration of an exemplary color-effective pattern which is made up of pixels and subpixels.

The metal layer is structured into the subpixel areas or subpixel regions 12 such that these correspond to subpixels 22 of pixels 23 of a color-effective pattern 20, which is illustrated by way of example in FIG. 2. Each pixel 23 in this embodiment is assigned three subpixels 22, which each bring about a monochromatic color effect or have a monochromatic color. The letters R, G, B correspondingly indicate the colors red, green, blue of the individual subpixels. The individual subpixels 22 are in each case assigned to one subpixel region 12 of the metal layer 11.

By way of example, the color pattern 20 is formed on the metal layer by applying colorants onto the corresponding subpixel regions 12. To this end, masks can be used in order to apply the various colorants. The masks here are configured in each case such that in each case only the subpixel regions that are assigned the corresponding color of a group of subpixels are exposed through the mask. The individual subpixel regions are preferably circular or elliptical. Accordingly, the subpixels are configured to be matched thereto. In the color-effective pattern 20 illustrated, each pixel 23 has three subpixels 22, in each case of the colors red, green and blue. Each pixel thus comprises one subpixel 22 which is red, one subpixel 22 which is green, and one subpixel 22 which is blue. The colorants thus cause in each case only monochromatic or substantially monochromatic light to be reflected by the subpixel regions. If a person views the metal layer in reflected light, the individual pixels are perceived as white, since, on account of color addition, the colors red, green and blue add up to give the color sensation white.

Depending on the choice of colorants, it may make sense to configure the subpixels and/or subpixel regions with various surface area sizes in order to obtain a desired starting color hue.

In order to carry out a color personalization or individualization later using the color-effective pattern, it is necessary "to remove" individual subpixels such that, on account of the color mixing of the remaining subpixels, a changed color sensation is brought about. If, for example, the blue subpixel is removed, then owing to the color mixing of the red and green colors, a yellow color sensation of the reflected light of the subpixel regions assigned to the subpixels is produced.

Typically, the color-effective pattern is of regular configuration. However, it is also possible to create a color-effective pattern of pixels in regular arrangement, while the subpixels are configured such that they are geometrically different with respect to their arrangement and/or vary with respect to their monochromatic color assignment. For a desired colored marking, it is of course necessary to know this arrangement and the color assignment. This can be correlated or coded for example with a serial number which was issued during production and is stored in the document body. It may also be stored in a database, for example. A forger who obtains a security document blank which is not yet marked can correctly mark said blank in color only if he knows the arrangement and color assignment of the subpixels.

In order to prevent mechanical damage to the metal layer 11 and a change in the color-effective pattern, a further substrate layer 50 is provided which is overlaid on the substrate layer 10 having the metal layer 11. Additionally provided in the embodiment illustrated is a laserable substrate layer 30, which is arranged under the substrate layer 10 having the metal layer 11. An additional, preferably transparent or white substrate layer 60 forms the lowermost substrate layer in the illustrated embodiment. The substrate layer 10 having the metal layer 11 and the color-effective pattern 20 formed therefrom, the further substrate layer 50 serving as the cover layer, the laserable substrate layer 30 and the additional substrate layer 60 are stacked one above the other and bonded preferably in a high-pressure, high-temperature lamination method to form a document body 80 of a security document blank 90. Such a document blank 90 is shown schematically in cross section in FIG. 3.

The substrate layer 10, the further substrate layer 50, the laserable substrate layer 30 and the additional substrate layer 60 are all preferably produced on the basis of the same plastics material, for example polycarbonate (PC), polyethylene (PE), polyvinyl chloride (PVC), polyethylene terephthalate (PET) or another plastics material. If all the substrate layers are made from the same plastics material or on the basis of the same polymer, the substrate layers can be bonded particularly well to form a document body. Owing to the structuring of the metal layer, webs 15 form between the individual subpixel regions 12, which webs reduce the tendency to delamination in particular between the substrate layer 10 and the further substrate layer 50, which serves as the cover layer.

Figure 3:
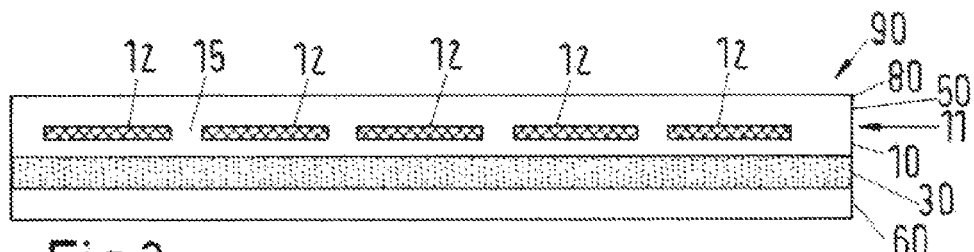
FIG. 3 shows a schematic cross-sectional illustration through a security document blank.
Figure 4:
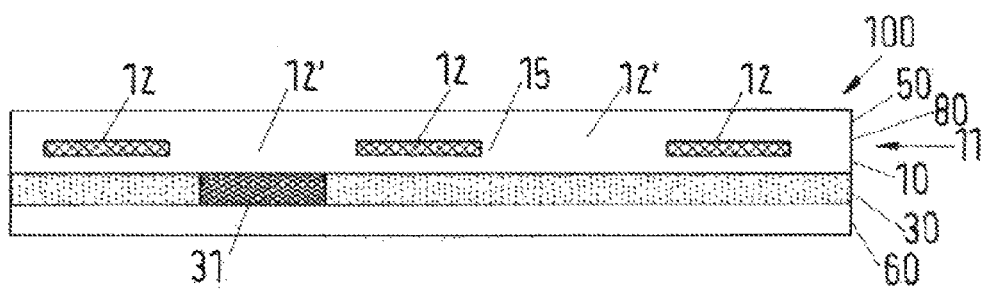
FIG. 4 shows a schematic sectional illustration through a personalized security document.

FIG. 4 illustrates a personalized security document 100 which is produced by way of personalization by laser for example from the security document blank 90 according to FIG. 3. When personalizing by laser, individual subpixel regions 12' of the metal layer 11 are demetalized in a targeted manner via the introduction of energy using electromagnetic radiation, in particular focused laser radiation, such that the document body becomes or is transparent at this site or at least the color effect of the subpixel 22 assigned to the subpixel region 12' of the color-effective pattern 20 loses or has lost its effect. Owing to the color mixing, the color sensation of pixels in which individual subpixels or their associated subpixel regions have been removed or destroyed thus changes.

In order to produce tinting of the color sensation, shading or even a gray or black color sensation of a pixel, individual or all subpixel regions of the pixel are removed, and subsequently a laser marking 31 is brought about by carbonizing the laserable substrate layer 30 or the material layer of the document body 80 produced therefrom. In particular if the additional substrate layer 60 is configured to be white, a gray or black laser marking of an individual subpixel which has been removed to achieve a color sensation of a pixel and is replaced by a gray value can influence a brightness and/or intensity of the resulting color of the pixel. If the subpixel region of the subpixel is merely removed, that color of the pixel of the remaining subpixels which results from color mixing is brighter than in the case where a gray or black laser marking is introduced into the document body 80 in the region of the removed subpixel of the laserable layer lying underneath.

Figure 5:
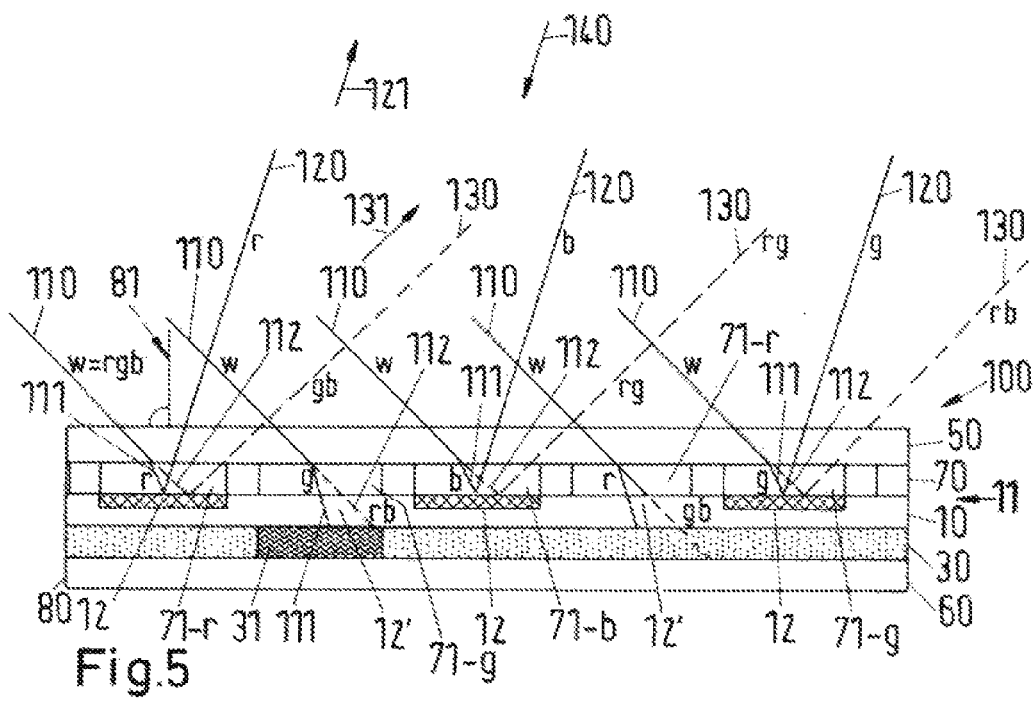
FIG. 5 shows a schematic sectional view through a further personalized security document.

In addition to using colorants for forming the color-effective pattern 20, it is possible to use diffractive structures, for example in the form of a hologram 70 which consists of various partial holograms 71. Such an embodiment is illustrated by way of example as a sectional view in FIG. 5. The embodiment according to FIG. 5 differs from that according to FIG. 4 in that a hologram 70 which comprises a partial hologram structure of partial holograms 71, which is matched to the subpixel regions 12, 12', is inserted between the further substrate layer 50, which serves as the cover layer, and the substrate layer 10 having the metal layer. The hologram 70 as a whole and the partial holograms 71 are configured in the illustrated embodiment in each case in the form of volume transmission holograms. That means that they have a high wavelength selectivity with respect to the reconstruction light. All the partial holograms 71 are preferably configured such that light of a specific wavelength or of a narrowly selected wavelength range is diffracted in each case by the same angle relative to an incident reconstruction light ray 110 on a subpixel region 12, 12' correspondingly located thereunder. In the illustrated embodiment, the assumption is held that white reconstruction light, which comprises red (r), green (g) and blue (b) spectral light and is incident on said security document 100 at 45° relative to the surface normal 81 of the document body 80 and is diffracted in each case in a wavelength-selective manner by the partial holograms 71. A partial hologram 71-r diffracts for example only light of the predefined red wavelength, and allows green and blue light to pass without diffraction. This non-diffracted light 112 is shown in dashed lines. A partial hologram 71-g, on the other hand, diffracts green light, and allows blue and red light to pass without diffraction. Finally, a partial hologram 71-b diffracts blue light, and allows red and green light to pass without being impeded. Owing to the diffraction, the light 111 diffracted by the partial holograms is incident on the subpixel regions 12 at a different angle than the non-diffracted light 112 of the reconstruction light ray 110 which passes through the partial holograms without being impeded. The diffracted light 111 thus exits the security document 100 after reflection at the subpixel regions arranged correspondingly thereunder as diffracted reflected light 120 in a different direction 121 than the non-diffracted light 130 reflected at the subpixel regions. The latter light exits in a direction 131. It is thus possible to perceive, in an observation direction 140, an information item which is individualized in color and is influenced with respect to its colorfulness of the individual pixels by selective removal and/or destruction, i.e. demetalization, of individual subpixel regions 12'. In this embodiment, a targeted carbonization of individual or all subpixels of a pixel is also possible. This produces markings 31.

Figure 6:
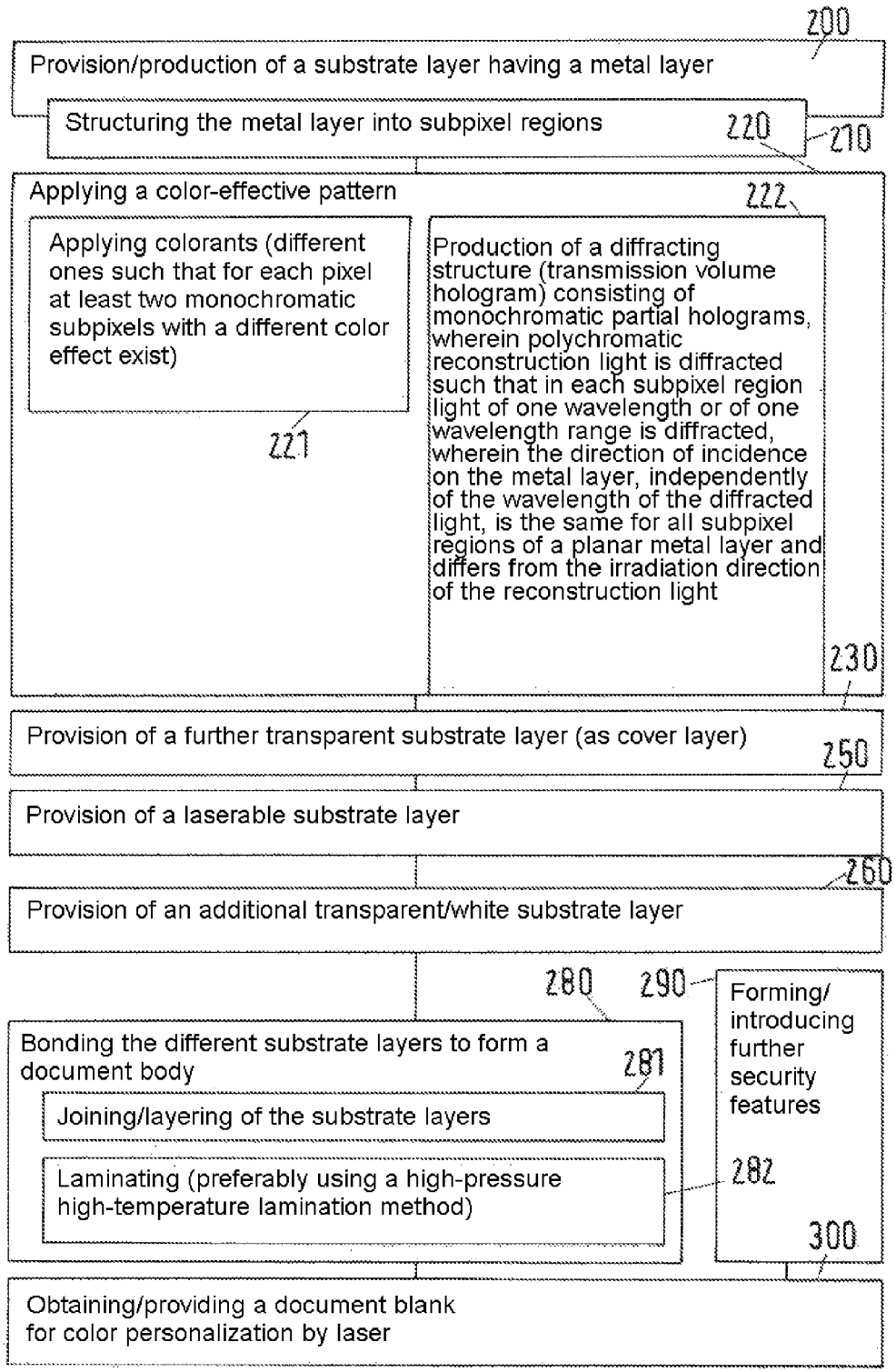
FIG. 6 shows a schematic illustration of a process diagram of a method for producing a security document blank.

FIG. 6 schematically illustrates a process diagram for producing a security document blank. First, a substrate layer having a metal layer is provided, or a substrate layer having a metal layer is produced. The metal layer can be produced for example by way of vapor deposition of metal on a plastic sheet. If a mask is used in the process, the metal layer can be produced in a structured state such that subpixel regions are automatically created during production. If the metal layer is produced initially with a contiguous surface area, it can subsequently be structured using a lithographic method. It is possible in principle for the metal film to be produced and structured in any desired manner. In some embodiments, a non-structured metal layer is also used. As is indicated in method step 210, the metal layer can be structured during or after being provided/produced. Subsequently, a color-effective pattern is applied 220. This can be effected by applying colorants 221. In this case, in one embodiment, different colorants are applied 221, such that for each pixel at least two different color-effective monochrome subpixels are produced. Preferably, three or more color-effective monochrome subpixels are produced per pixel. Alternatively, the color-effective pattern can be produced by the production of a diffractive structure 222, for example by forming a volume transmission hologram consisting of a matrix of monochromatic partial holograms of different types. Here, the diffracting structure is configured such that polychromatic reconstruction light is diffracted such that in each subpixel area, i.e. on each subpixel region assigned to a partial hologram, light of one wavelength or of one wavelength range is diffracted, wherein the direction of incidence on the metal layer, irrespective of the wavelength of the diffracted light, is preferably the same for all subpixel regions of a planar metal layer and differs from the irradiation direction of the reconstruction light.

In addition, a further transparent substrate layer is provided 230. In the illustrated embodiment, additionally a laserable substrate layer 250 and an additional transparent or white substrate layer 260 are provided. The individual substrate layers are bonded together to the metal layer and the color pattern formed thereon to form a document body 280. At the same time or before, further security features may be formed or introduced 290. The bonding of the various substrate layers to form a document body is effected preferably via joining of the substrate layers or stacking of the substrate layers 281 one on top of the other and subsequent lamination 282, preferably using a high-pressure, high-temperature lamination method. This method produces a document blank for color personalization by laser 300.

Figure 7:
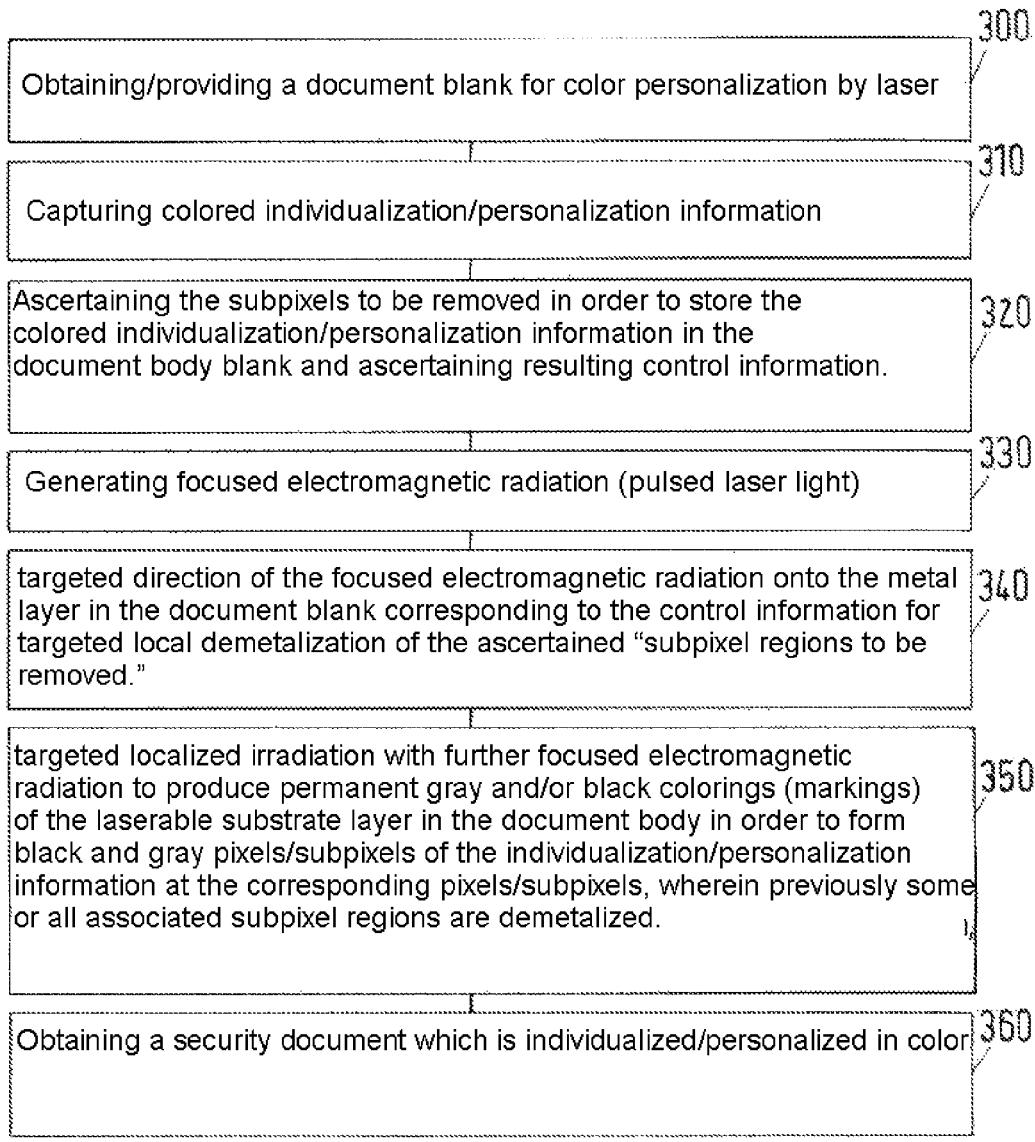
FIG. 7 shows a schematic illustration of a method for color individualization by laser/color personalization by laser.

FIG. 7 illustrates by way of example a method for color personalization by laser. If these method steps directly follow those of the method illustrated in FIG. 6, the combination of the two methods results in a method for producing a security document which has been personalized by laser in color.

The method according to FIG. 7 thus starts with the method step of providing or obtaining a document blank for color personalization by laser 300. In order to be able to effect the color personalization by laser and/or individualization, colored individualization information and/or personalization information is captured 310. The word "colored" in this case means that the personalization and/or individualization information comprises, in addition to content, also color information which indicates the color in which the respectively included content in the security document should be formed. Subsequently, the subpixels to be removed are ascertained, which subpixels should be removed in order to store individualization/personalization information in the document blank, and the control information resulting from said ascertainment is derived 320. This means that the subpixel regions are determined which are to be demetalized. Subsequently, focused electromagnetic radiation is generated, which is generated preferably in the form of focused pulsed laser radiation 330. According to the control information, the focused electromagnetic radiation, for example the focused laser radiation, is directed onto the metal layer in the document blank in order to effect targeted local demetalization of the ascertained subpixel regions to be removed 340. Optionally, generation of permanent gray and/or black markings in the laserable substrate layer in the document blank is subsequently brought about by targeted localized irradiation with further focused electromagnetic radiation, which can be made available using the same laser as the radiation used for demetalization, in order to form black and/or gray pixels of the individualization/personalization information in the corresponding pixels and/or bring about a color gradation of the color effect which result on the basis of color addition of remaining subpixels of a pixel 350. The result is a security document which has been individualized/personalized in color 360.

It is to be appreciated that only exemplary embodiments are described. The individual features described in the different embodiments can be used in combination to implement the invention. By way of example, the color-effective pattern may be formed partially using colorants and partially using diffractive structures.

LIST OF REFERENCE SIGNS

- 10 substrate layer
- 11 metal layer
- 12' subpixel regions
- 12 demetalized subpixel regions
- 14 reflective surface
- 15 webs
- 20 color-effective pattern
- 22 subpixels
- 23 pixels
- 30 laserable substrate layer
- 31 marking
- 50 further substrate layer (as cover layer)
- 60 additional substrate layer (preferably white/transparent)
- 70 hologram
- 71 partial holograms
- 71-$r$ partial hologram diffracting red light
- 71-$g$ partial hologram diffracting green light
- 71-$b$ partial hologram diffracting blue light
- 80 document body
- 81 surface normal
- 90 document blank
- 100 security document personalized by laser in color
- 110 reconstruction light ray
- 111 diffracted light
- 112 non-diffracted light
- 120 diffracted and reflected reconstruction light
- 121 direction of the diffracted and reflected light
- 130 non-diffracted reflected reconstruction light
- 131 direction of the non-diffracted and reflected light
- 140 observation direction
- 200-300 method steps for forming a security document blank
- 300-360 method steps for color personalization by laser of a security document

The invention claimed is:

1. A method for producing a colored security document blank to be personalized by laser or a security document, the method comprising the following steps:
providing a substrate layer with a metal layer or applying a metal layer on a substrate layer, the metal layer being structured into subpixel regions;
forming a regular color-effective pattern on the metal layer, the pattern having a pixel structure with pixels and each pixel including at least two respective differently colored subpixels each bringing about a monochromatic color effect;
assigning to each subpixel a subpixel region being separate and at a distance from neighboring subpixel regions, and
bonding the substrate layer to at least one further transparent substrate layer to form a document body.

2. The method according to claim 1, which further comprises structuring the metal layer or providing the metal layer in a structured form.

3. The method according to claim 2, which further comprises producing the subpixel regions by vapor deposition.

4. The method according to claim 2, which further comprises forming the subpixel regions using a lithographic method.

5. The method according to claim 1, which further comprises at least one of producing or applying the subpixels as partial holograms of a hologram forming the color-effective pattern.

6. The method according to claim 1, which further comprises forming the color-effective pattern by applying colorants on or introducing colorants into the metal layer.

7. A security document blank for color personalization by laser, the security document blank comprising:
a document body having a metal layer structured into subpixel regions and a regular color-effective pattern formed on said metal layer;
said subpixel regions being separate and spaced apart from one another;
said color-effective pattern having a pixel structure with pixels and each of said pixels including a plurality of differently colored subpixels;
at least two respective subpixels being assigned to each one of said pixels and each bringing about a monochromatic color effect;
each of said subpixel regions being assigned a respective one of said subpixels of said color-effective pattern; and
at least one transparent substrate layer covering said metal layer and said color-effective pattern.

8. A method for producing a security document using color personalization by laser of a security document blank, the method comprising the following steps:
producing a security document blank using the method according to claim 1;
capturing at least one of colored individualization or personalization information;
ascertaining the subpixels and associated areas of the metal layer having a color effect which must be canceled by demetalization in order to achieve a desired colored representation of the at least one of individualization or personalization information;
generating a focused pulsed laser beam; and
directing the focused pulsed laser beam onto the metal layer for locally demetalizing the ascertained areas of the metal layer to be demetalized in a targeted manner and removing the color effect of the subpixels assigned to the areas having been demetalized in a targeted manner.

9. The method according to claim 8, which further comprises blackening a laserable plastic layer disposed under the metal layer by further targeted irradiation with focused laser radiation through one or more locally demetalized areas of the pixel for at least one of forming a black or gray color effect of a pixel or tinting a mixed color of the pixel resulting from remaining color-effective subpixels after local demetalization of at least one area assigned to a subpixel of the pixel.

10. A security document, comprising:
a document body having a metal layer structured into subpixel regions and a regular color-effective pattern formed on said metal layer;
said subpixel regions being separate and spaced apart from one another;
said color-effective pattern having a pixel structure with pixels and each of said pixels including a plurality of differently colored subpixels;
at least two respective subpixels being assigned to each one of said pixels and each bringing about a monochromatic color effect;
each of said subpixel regions being assigned a respective one of said subpixels of said color-effective pattern;
at least one transparent substrate layer covering said metal layer and said color-effective pattern; and subpixel regions being assigned to said subpixels and demetalized in said metal layer to store an information item in color in said document body.

* * * * *